(12) United States Patent
Morris et al.

(10) Patent No.: US 12,204,062 B2
(45) Date of Patent: Jan. 21, 2025

(54) MARKER DEVICE FOR UNDERGROUND INFRASTRUCTURE

(71) Applicant: 3M INNOVATIVE PROPERTIES COMPANY, St. Paul, MN (US)

(72) Inventors: Gary A. Morris, Leander, TX (US); Ziyad H. Doany, Austin, TX (US)

(73) Assignee: 3M Innovative Properties Company

( * ) Notice: Subject to any disclaimer, the term of this patent is extended or adjusted under 35 U.S.C. 154(b) by 345 days.

(21) Appl. No.: 17/655,577

(22) Filed: Mar. 21, 2022

(65) Prior Publication Data

US 2022/0308248 A1 Sep. 29, 2022

Related U.S. Application Data

(60) Provisional application No. 63/200,782, filed on Mar. 29, 2021.

(51) Int. Cl.
*G01V 3/08* (2006.01)
*G01V 15/00* (2006.01)

(52) U.S. Cl.
CPC ............... *G01V 3/08* (2013.01); *G01V 15/00* (2013.01)

(58) Field of Classification Search
CPC .................................. G01V 3/08; G01V 15/00
USPC ......................................................... 324/326
See application file for complete search history.

(56) References Cited

U.S. PATENT DOCUMENTS

| 7,915,894 | B2 | 3/2011 | Minarovic | |
|---|---|---|---|---|
| 2010/0021232 | A1* | 1/2010 | Kulp | E01F 9/654 404/10 |
| 2012/0068823 | A1 | 3/2012 | Doany | |
| 2012/0325359 | A1 | 12/2012 | Doany | |
| 2013/0099790 | A1 | 4/2013 | Doany | |
| 2015/0226872 | A1* | 8/2015 | Doany | G01V 3/081 324/329 |
| 2016/0030756 | A1 | 2/2016 | Dronov | |
| 2017/0089512 | A1* | 3/2017 | Muntasser | E01F 9/00 |
| 2017/0299757 | A1* | 10/2017 | Bench | G01V 3/165 |
| 2018/0128931 | A1* | 5/2018 | Olsson | G01V 15/00 |
| 2021/0231833 | A1* | 7/2021 | Bench | H01Q 1/24 |

* cited by examiner

*Primary Examiner* — Raul J Rios Russo
(74) *Attorney, Agent, or Firm* — Gregg H. Rosenblatt

(57) ABSTRACT

A marker device for locating buried infrastructure comprises a cover, a marker detectable underground by a magnetic field detecting locating device; and a holder formed from a compliant material. The marker has a diameter smaller than an inner diameter of the cover. The marker is secured between an inner surface of the cover and a first surface of the holder. The holder is configured to attach to an outer surface of a utility valve cap of an underground valve.

6 Claims, 3 Drawing Sheets

MARKER DEVICE FOR UNDERGROUND INFRASTRUCTURE

BACKGROUND

Several different types of devices have been used for decades to help mark, identify, and locate buried infrastructure. For example, tracer wire can be placed alongside a plastic pipe. The ends of the wire can be either spliced onto another segment or brought to the surface. A tracer wire that has been brought up to the surface can be located by connecting a signal transmitter to the wire. A transmitter applies an AC signal which creates a magnetic field along the length of the wire. This magnetic field can be detected with a receiver that has built-in antennas that are designed to pick up the signal. The receiver can be used to find the center of the magnetic field so that paint or flags can be used to mark the ground directly above the tracer wire.

Tracer wire requires a continuous path and requires a good far end ground or equivalent conductive path for signal to travel. If a tracer wire is broken, then the magnetic field may not be strong enough for detection or may be undetectable in sections, as the signal sent out by the transmitter must return to the transmitter for a complete electrical path. A broken wire, damaged insulation, depth change or built-up corrosion at the connection point of a splice can prevent a detectable signal. Further, when a tracer wire is detectable there may not be an exact location along the path of certain portions of the buried infrastructure, such as a tee, joint, or valve. Thus, it may be necessary to dig test holes to search for the needed component.

In addition, some utilities will bury a caution tape within 6 to 12 inches of the surface directly over the path. This tape is often made of a laminated aluminum and is detected with a metal detector from the surface. This type of detectable tape can corrode over time and create spotty paths with sections missing due to corrosion.

Alternatively, buried plastic caution tape is also used to provide an early warning visual tape to alert excavators. The tape is color coded with APWA (American Public Works Association) color designations for different utilities, with yellow for gas or red for power, as examples. However, this type of tape is not detectable using a conventional locating device and must be excavated to provide path information.

In a further alternative, several utilities are also burying tape with markers attached onto the tape along the path of the underground facility. This marker provides a locatable path when a compatible locator is used. This type of path marking does not require a continuous path to function as the attached markers respond independently to a compatible locator. However, such path marking solutions may not indicate where a particular component of the facility, such as a valve, may be located. Accordingly, it may be necessary to dig test holes to search for the needed component.

Other underground detection systems are described in U.S. Pat. No. 7,915,894; US Pubs. 2012/0068823; 2012/0325359; 2013/0099790; and 2016/0030756.

SUMMARY OF THE INVENTION

In a first aspect of the invention, a marker device for locating buried infrastructure comprises a cover, a marker detectable underground by a magnetic field detecting locating device; and a holder formed from a compliant material. The marker has a diameter smaller than an inner diameter of the cover. The marker is secured between an inner surface of the cover and a first surface of the holder. The holder is configured to attach to an outer surface of a utility valve cap of an underground valve.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention will be described hereinafter in part by reference to non-limiting examples thereof and with reference to the drawings, in which.

Figure 1:
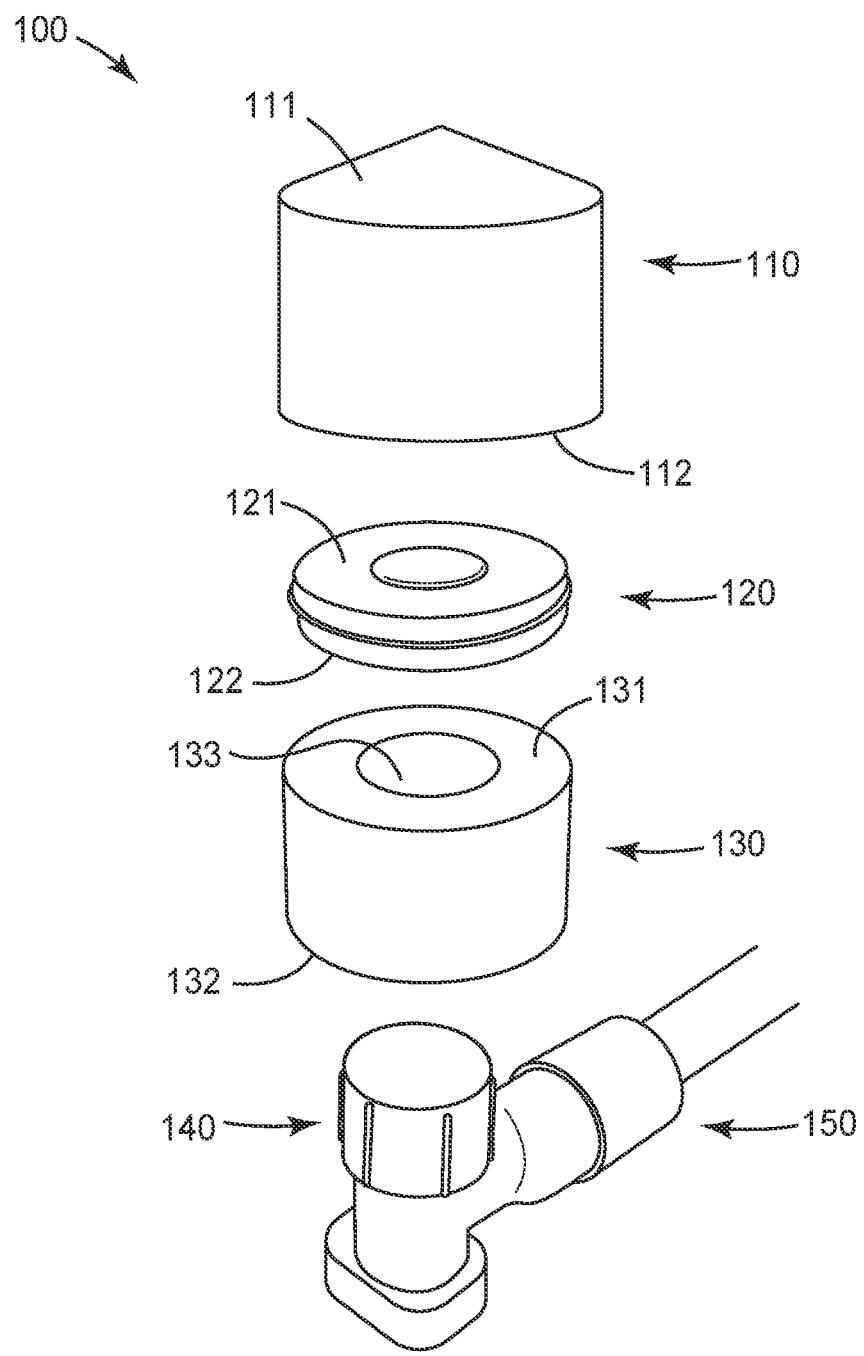
FIGS. 1-2 are exploded views of a marker device according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

A marker device is provided that allows for straightforward installation and identification of an underground asset or assets. The marker device design described herein provides stabilized marker securement and placement in a rugged underground environment.

Figure 2:
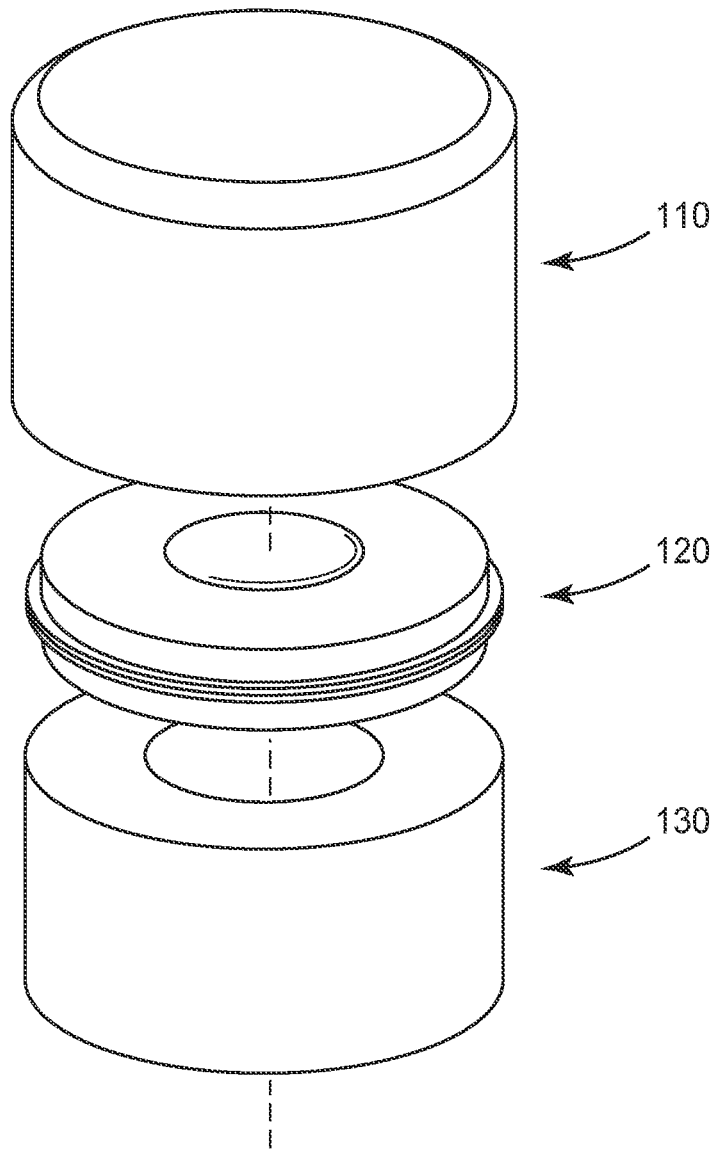

FIGS. 1 and 2 show a first aspect of the present invention, an exploded view of a marker device 100. Marker device 100 includes a cap or cover 110, a marker 120, and a holder 130. The marker device 100 is configured to attach to an underground infrastructure component, such as a utility valve cap 140 of valve 150. In some aspects, the marker device can be used to identify and locate a buried valve of a gas pipeline. In alternative aspects, the marker device can be utilized with water or oil pipelines, to identify and locate infrastructure therein, such as shutoff valves.

In one embodiment, marker 120 is secured within device 100, as marker 120 is disposed between an inner surface 111 of cover 110 and a first surface 131 of holder 130. Optionally, an additional holder or spacer (not shown) can be disposed between the inner surface 111 of cover 110 and an upper surface 121 of marker 120.

Figure 3:
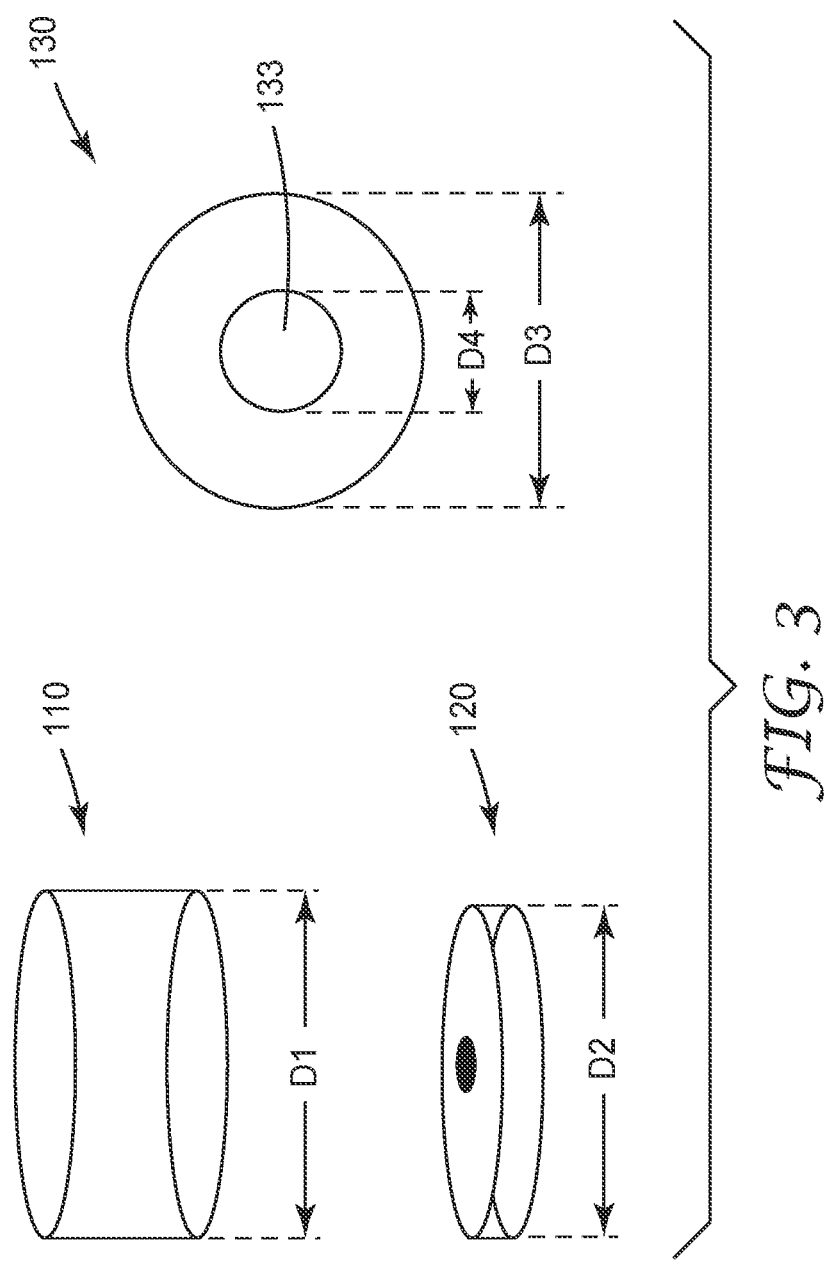
FIG. 3 is another view of components of a marker device according to an embodiment of the invention.

In one aspect, as shown in FIG. 3, the marker 120 has a diameter D2 smaller than an inner diameter D1 of the cover 110. In this manner, the cover 110 can accommodate different size markers 120.

In more detail, cover 110 can comprise a hollowed out, rigid, plastic material formed as a cap or shell, and having an opening 112 that can accommodate a marker 120 and holder 130, where the marker 120 is disposed between cover inner surface 111 and surface 131 of holder 130. In one aspect, the cover 110 is formed from a vinyl material having a 3-5 inch (diameter) opening 112, and a height of 2-4 inches. For example, the opening 112 can have a diameter D2 of about 4 inches.

Marker 120 can comprise a marker detectable underground by a magnetic field detecting locating device that transmits a signal to the buried marker, where the marker provides a return signal, indicating the marker's exact position. Marker 120 may also include functionality to allow facility data to be stored on marker 120. In one aspect, marker 120 can comprise a disk-shaped marker, such as a conventional disk marker (e.g., a 3M™ Electronic Marker System 14xx series disk marker, available from 3M Company, Saint Paul, MN). In one example, marker 120 has an outer diameter (D2) of 3.85 inches. Other size markers can also be utilized in marker device 100.

Holder 130 can comprise a ring-shaped cylinder formed from a compliant material, such as a polymer material. For example, holder 130 can be formed from a polymer material such as extruded polyethylene. As such, the material forming holder 130 is compliant and has a small degree of compressibility, allowing it to be inserted in opening 112 of cover 110, such that the outer circumferential surface of holder 130 can snugly fit inside (and slightly press radially against) the sidewalls of cover 110. In this manner, the marker 120 can be securely retained between surface 131 of holder 130 and inner surface 111 of cover 110. In the example of FIGS. 1-3, holder outer diameter D3 is substantially the same as, or slightly larger than, the inner diameter D1 of cover 110.

In addition, holder 130 can include a cylindrical hole or cutout portion 133 that is configured to fit over the outer surface of an underground asset, such as a utility valve cap 140 of valve 150, which can be part of an underground utility system, such as a gas pipeline, water pipeline, or oil pipeline. As shown in FIG. 1, the valve cap 140 can have an outer annular surface. As mentioned above, holder 130 is formed from a compliant material, so that the diameter of hole or cutout portion 133 can be substantially the same as or slightly smaller than the diameter of the outer surface of valve cap 140. In this manner, holder 130 can be slid onto the outer surface of valve cap 140, thereby providing a gripping or snug friction fit onto the valve cap 140 of valve 150.

In one example, the holder can have an outer diameter D3 of about 3-5 inches, and a height of about 1-2 inches. The diameter (D4) of the hole or cutout portion 133 can be from about 1.5 inches to about 2.5 inches, depending on the size of the utility valve cap that receives the marker device.

In an alternative aspect, the hole or cutout portion 133 of holder 130 can be formed to accommodate differently-shaped or sized facility components, depending on the application.

Overall, the marker device 100 is thus attached to the utility valve cap, with the holder 130 attaching to the underground facility and securing the marker 120 within cover 110. In addition, the holder is configured to substantially level the marker 120 when installed/deployed. Thus, marker device 100 provides secure placement to the buried infrastructure component and identifies the exact location of the buried infrastructure component when in the presence of a locator device.

In addition, the configuration of marker device 100 acts to stabilize the marker 120 while gripping the valve cap 140. This design is advantageous when burying the marker device/facility component, as there will likely be disruption of the adjacent soil area, as well as potentially damaging impediments (e.g., dirt, rocks) poured over the marker device during the burial process. This marker device design can stably and securely hold the marker 120 in place and more evenly distribute any pressure to a larger area of the maker 120.

The present invention has now been described with reference to several individual embodiments. The foregoing detailed description has been given for clarity of understanding only. No unnecessary limitations are to be understood or taken from it. It will be apparent to those persons skilled in the art that many changes can be made in the embodiments described without departing from the scope of the invention. Thus, the scope of the present invention should not be limited to the details and structures described herein, but rather by the structures described by the language of the claims, and the equivalents of those structures.

The invention claimed is:

1. A marker device for locating buried infrastructure, comprising:
    a cover;
    a marker detectable underground by a magnetic field detecting locating device; and
    a holder formed from a compliant material, wherein the marker has a diameter smaller than an inner diameter of the cover, wherein the marker is secured between an inner surface of the cover and a first surface of the holder, and wherein the holder is configured to slidingly attach to an outer surface of a utility valve cap of an underground valve.

2. The marker device of claim 1, wherein the holder secures to an outer annular surface of the utility valve cap via friction fit.

3. The marker device of claim 1, wherein the holder formed from a polymer material having an outer diameter substantially the same as an inner diameter of the cover to provide for a sliding friction fit to an inner wall of the cover.

4. The marker device of claim 1, wherein the holder comprises a ring shape that includes a hole or cutout portion having a diameter substantially the same as an outer diameter of the utility valve cap.

5. The marker device of claim 1, wherein the holder comprises an extruded polyethylene material.

6. The marker device of claim 1, wherein the marker comprises a disk marker.

* * * * *